(12) United States Patent
Reynaud et al.

(10) Patent No.: US 7,968,009 B2
(45) Date of Patent: Jun. 28, 2011

(54) ELECTRICALLY CONDUCTIVE NANOCOMPOSITE PARTICLES HAVING A POLYALKYL ACRYLATE CORE AND A POLYANILINE COATING

(75) Inventors: Stéphanie Reynaud, Lons (FR); Nicolas Kohut Svelko, Pau (FR); Mathieu Joubert, Pau (FR)

(73) Assignees: UPPA-Universite de Pau et des Pays de l'Adour, Pau Cedex (FR); Centre National de la Recherche Scientifique (C.N.R.S.), Paris (FR)

( * ) Notice: Subject to any disclaimer, the term of this patent is extended or adjusted under 35 U.S.C. 154(b) by 363 days.

(21) Appl. No.: 11/996,814

(22) PCT Filed: Jul. 21, 2006

(86) PCT No.: PCT/FR2006/001792
§ 371 (c)(1),
(2), (4) Date: Jun. 30, 2008

(87) PCT Pub. No.: WO2007/012736
PCT Pub. Date: Feb. 1, 2007

(65) Prior Publication Data
US 2009/0212263 A1   Aug. 27, 2009

(30) Foreign Application Priority Data
Jul. 29, 2005  (FR) ..................... 05 08172

(51) Int. Cl.
*H01B 1/00* (2006.01)
*B05D 3/02* (2006.01)
*C08L 83/00* (2006.01)
*C08G 75/00* (2006.01)
*C08G 73/06* (2006.01)

(52) U.S. Cl. ............... 252/500; 427/385.5; 523/201; 528/377; 528/423

(58) Field of Classification Search ............ 252/500; 427/385.5; 523/201; 528/377, 423
See application file for complete search history.

(56) References Cited

U.S. PATENT DOCUMENTS

| 4,983,656 A * | 1/1991 | Ito et al. ............... 524/109 |
| 5,415,893 A | 5/1995 | Wiersma et al. |
| 6,399,675 B1 | 6/2002 | Kim et al. |
| 6,593,399 B1 | 7/2003 | La Fleur et al. |
| 2003/0065090 A1 * | 4/2003 | Kelly et al. ............... 525/63 |

FOREIGN PATENT DOCUMENTS

EP 1258513 11/2002
WO WO 2007111996 A2 * 10/2007

OTHER PUBLICATIONS

"Emulsion Polymerization," http://en.wikipedia.org/wiki/Emulsion_polymerization.*
"Emulsion polymerization," http://en.wikipedia.org/wiki/Emulsion_polymerization, Sep. 26, 2007.*

* cited by examiner

*Primary Examiner* — Mark Kopec
*Assistant Examiner* — Jaison P Thomas
(74) *Attorney, Agent, or Firm* — B. Aaron Schulman, Esq.; Terry L. Wright, Esq.; Stites & Harbison PLLC

(57) ABSTRACT

The invention concerns electrically conductive composite nanoparticles having an alkyl polyacrylate core and a polyaniline coating, the dispersions comprising them and their use for preparing conductive films. The invention also concerns a method for making particles, comprising an elastomeric core and a polyaniline coating.

26 Claims, No Drawings

ELECTRICALLY CONDUCTIVE NANOCOMPOSITE PARTICLES HAVING A POLYALKYL ACRYLATE CORE AND A POLYANILINE COATING

The present invention relates to electrically conductive nanocomposite particles having a polyalkyl acrylate core and a polyaniline coating, to dispersions comprising them and to their use in the preparation of conductive films. The invention relates also to a process for the preparation of particles comprising an elastomeric core and a polyaniline coating.

Intrinsically conductive polymers (ICPs) have the electronic properties of semiconductors as well as the mechanical properties of polymers. Among the most well known ICPs there may be mentioned polypyrrole, polythiophene and polyaniline.

Polyaniline (PANI) is particularly valuable owing especially to its good thermal stability under atmospheric conditions, its low cost, its anti-corrosion properties and its high conductivity. However, polyaniline is a rigid material which is infusible and soluble in a very limited number of solvents, which makes it particularly difficult to handle and limits its use.

A number of methods allowing the handling of polyaniline to be improved have been described, in particular methods using a core-coating structure. The core, which is generally constituted by an inorganic polymer or by a vinyl polymer, confers mechanical properties on the composite material, while the coating, which is constituted by the conductive polymer, provides conductive properties.

However, it has been shown that the conductive properties of the resulting composite material vary considerably depending on the nature of the polymer constituting the core. Conversely, the mechanical properties of the polymer constituting the core can vary depending on the nature of the intrinsically conductive polymer constituting the coating.

Core-coating [polyurethane-polyaniline] particles have been described in EP 0589 529. Particles comprising a core of copolymer of n-butyl acrylate, methyl methacrylate and allyl methacrylate and a coating of polyaniline are described in U.S. Pat. No. 6,399,675.

In addition, there has also been described a process for the preparation of particles comprising a coating of polyaniline and a thermoplastic core of polystyrene in a single batch (N. Kohut Svelko, S. Reynaud, Langmuir 2005, 21, 1575-1583).

Nanocomposite particles comprising an elastomeric core constituted by a polyalkyl acrylate homopolymer, a coating constituted by polyaniline and a surfactant have now been synthesized.

Surprisingly, those particles make it possible to obtain composites having both high conductivity and good film-forming properties. By way of example, conductivities of from 0.0001 to 5.00 S/cm, and especially from 0.01 to 5.00 S/cm, for example, from 0.01 to 0.20 S/cm more particularly, are obtained for compositions having low polyaniline contents, especially from 5 to 20% by weight polyaniline.

Moreover, such composites exhibit good properties of adhesion to various materials, especially to glass, paper, metal.

Finally, such composites remain conductive at temperatures varying from 20° C. to 200° C. over dwell times which can reach several hours, in a saturated atmosphere up to 90% humidity and in an acidic or basic medium (pH varying from 1 to 10).

The dispersions of those particles allow a conductive film to be applied to objects in a simple manner. Accordingly, after homogeneous application of the dispersion to an object and removal of the dispersing medium, a conductive coating is obtained.

Furthermore, those particles having a core of simple composition are inexpensive, readily available and can be prepared according to a particularly advantageous process. Accordingly, there has also been developed a process for the preparation of particles comprising an elastomeric core, a polyaniline coating and a surfactant, in which process the polymerization reactions of the polyaniline and of the elastomeric polymer are advantageously carried out directly in the same medium.

The process constitutes an economical process which is simple to carry out, is rapid and does not require any specific apparatus to obtain conductive composites having film-forming properties at the end of the synthesis. More precisely, the process can be carried out under gentle conditions, in an aqueous medium, starting from commercial products, in a single reactor, and therefore constitutes a process which can readily be transposed to the industrial scale.

According to another advantageous aspect, the process can be carried out starting from only four reagents: an elastomeric monomer, a surfactant, a polymerization catalyst and an aniline monomer.

Particles

Accordingly, according to a first aspect, the present invention relates to electrically conductive nanocomposite particles comprising:
- a core constituted by a poly-$C_1$-$C_6$-alkyl acrylate homopolymer or by a copolymer of $C_1$-$C_6$-alkyl acrylate and an $\alpha,\beta$-unsaturated amide comonomer;
- a coating constituted by polyaniline;
- a surfactant.

"Nanocomposite" is understood as meaning composite particles having a size less than one micrometer. The size of the core is generally of the order of from 20 nm to 700 nm and the size of the coating is generally of the order of from several nm to 100 nm.

Within the scope of the present description, the term "polyaniline" includes polyaniline or a derivative thereof. Polyaniline derivatives are polymers in which the aniline monomer units are substituted on the nitrogen or on the aromatic ring. Examples of substituents of the aromatic ring are especially the hydroxy group, lo halogen atoms, in particular chlorine, $C_1$-$C_4$-alkyl groups, in particular methyl, ethyl, isopropyl, and $C_1$-$C_4$-alkoxy groups, such as methoxy, ethoxy, n- or iso-propoxy, n-, iso- or tert-butoxy. The nitrogen atom can be substituted, for example, by $C_1$-$C_4$-alkyl groups.

"Coating constituted by polyaniline" is understood as being a continuous or discontinuous deposit constituted by polyaniline which is bonded physically (i.e. adsorbed) and/or chemically (i.e. grafted) to the surface of the polyalkyl acrylate core. The coating is preferably discontinuous. The coating is preferably adsorbed onto the surface of the core.

A "polyalkyl acrylate homopolymer" means a polymer resulting from the linking of several identical alkyl acrylate monomer units.

Within the scope of the present description, the term "polyalkyl acrylate" includes polyalkyl methacrylates. Examples of poly-$C_1$-$C_6$-alkyl acrylates are especially polymethyl methacrylate, polymethyl acrylate, polyethyl acrylate, polyethyl methacrylate, poly-n-propyl or -isopropyl acrylate, poly-n-propyl or -isopropyl methacrylate, poly-n-, -sec- or -tert-butyl acrylate and poly-n-, -sec- or -tert-butyl methacrylate.

The poly-$C_1$-$C_6$-alkyl acrylate is preferably poly-n-butyl acrylate. It advantageously has a glass transition temperature of −54° C., which allows film-forming properties at ambient temperature to be obtained.

According to a variant of the invention, the polyalkyl acrylate is crosslinked. Examples of particularly suitable crosslinking agents are especially diacrylate compounds, preferably 1,6-hexanediol diacrylate. The latter is available especially under the trade name SR238® (Cray Valley). Crosslinking of the polyalkyl acrylate allows the mechanical properties of the conductive composite to be modulated and, especially, its elasticity to be reduced.

According to a preferred variant of the invention, the core is constituted by a $C_1$-$C_6$-alkyl acrylate copolymer and an α,β-unsaturated amide comonomer.

It has been shown that the presence of amide functions on the core particles allows their compatibility with the polyaniline coating to be improved and permits an improvement in both the covering of the core and the conductivity. Accordingly, without wishing to be limited to one theory, it has been shown that the presence of amide functions promotes the establishment of hydrogen bonds with the polyaniline.

Within the scope of the present description, the term "α,β-unsaturated amide comonomer" includes α,β-unsaturated amides and derivatives thereof. The α,β-unsaturated amide is preferably ethylenically unsaturated and more preferably is acrylamide. Unsaturated amide derivatives are monomers that are substituted on the double or triple bond, for example by alkyl groups such as methyl, ethyl, propyl. An example of an α,β-unsaturated amide derivative which may be mentioned is especially acrylamide and its derivatives, such as methacrylamide. The copolymer of poly-$C_1$-$C_6$-(alkyl acrylate) and α,β-unsaturated amide comonomer can be a block, graft or random copolymer.

The ratio by weight of alkyl acrylate-type monomer/α,β-unsaturated amide comonomer preferably varies from 90/10 to 99.5/0.5.

The ratio by weight of polyalkyl acrylate/polyaniline or copolymer of alkyl acrylate with an α,β-unsaturated amide comonomer/polyaniline preferably varies from 45:55 to 98:2 and is preferably from 50:50 to 95:5.

The particles according to the invention are obtained by polymerization of the polyaniline in a dispersion of polyalkyl acrylate (or of a copolymer of alkyl acrylate/α,β-unsaturated amide comonomer) stabilized by the presence of a surfactant. The surfactant can be non-ionic or ionic, especially anionic. It is preferably non-ionic, because ionic surfactants can interfere in an undesirable manner with the polymerization reactions, in particular during the polyaniline polymerization.

"Non-ionic surfactant" is understood as being a surfactant that is not charged under the operating conditions.

The non-ionic surfactant can be physically adsorbed to the surface of the polyalkyl acrylate particles (i.e. physically bonded) or incorporated into the polyalkyl acrylate (i.e. chemically bonded).

The non-ionic surfactant is preferably physically bonded to the polyalkyl acrylate. This can be achieved by carrying out the polymerization of the polyalkyl acrylate in the presence of non-ionic surfactant.

The non-ionic surfactant can be selected from a wide variety of compounds including especially alkylphenol alkoxylates, alcohol alkoxylates, alkyl alkoxylates, amine alkoxylates, alkylamine oxides, in particular from alkylphenol ethoxylates, alcohol ethoxylates, alkyl ethoxylates, or EO/PO (ethylene oxide/propylene oxide) block copolymers, amine ethoxylates or polyethoxylates.

However, very particular preference is given to non-ionic surfactants corresponding to the following formula (I):

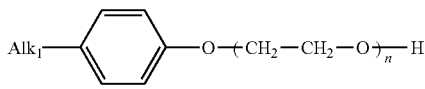

wherein $Alk_1$ denotes a $C_1$-$C_{20}$-alkyl group and n represents an integer from 1 to 100.

$Alk_1$ is preferably a $C_1$-$C_{15}$-alkyl group.

According to a particularly preferred variant there is used nonylphenol ethoxylate having preferably 40 ethoxylate units and represented by the formula below:

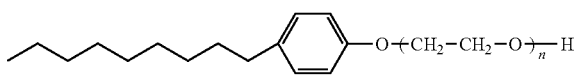

wherein n=40.

That surfactant is advantageously available commercially, especially under the name Igepal® CO 897 (Rhodia).

The amount of non-ionic surfactant employed is not critical and can vary considerably. Accordingly, dispersions of particles of small size generally require a larger amount of stabilizing surfactant than particles of a larger size. However, the amount must be sufficient to allow the polyalkyl acrylate particles to be stabilized and must not be too great that the mechanical and conductive properties of the particles are altered.

The non-ionic surfactant present in the particles according to the invention generally represents from 1% to 20% by weight, more preferably from 1 to 10% by weight, the by-weight values being expressed based on the total dry weight of the coating and the core.

According to a particularly preferred variant of the invention, the particles further comprise a second non-ionic surfactant having chemical functions capable of improving the conductivity of the composite.

There may be mentioned by way of example non-ionic surfactants comprising at least one amide function, such as the compounds of formula (II):

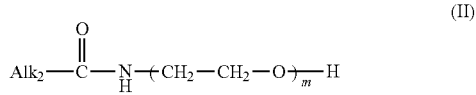

(II)

wherein $Alk_2$ denotes a $C_1$-$C_{20}$-alkyl group, preferably a $C_1$-$C_{15}$-alkyl group, and m represents an integer from 1 to 100.

According to a preferred variant, there is used a compound of formula (II) wherein $Alk_2$ is a $C_{11}$-alkyl group and m represents an average number of 6. That compound is available commercially under the name Ninol® (Stepan).

Accordingly, without wishing to be limited to one theory, it has been shown that the amide functions present at the surface of the core allow better coverage of the core particle to be obtained and also permit the establishment of hydrogen bonds with the polyaniline. Those properties therefore allow the conductivity to be improved.

The second non-ionic surfactant preferably represents from 1% to 20% by weight, based on the dry weight of the coating and the core.

Dispersion of Particles

According to another aspect, the invention relates to a dispersion comprising the particles as defined above in a dispersing medium. The particles are preferably dispersed in an aqueous medium, especially in water.

The solids content of the dispersion of particles of polyalkyl acrylate or of copolymer of alkyl acrylate/$\alpha,\beta$-unsaturated amide comonomer is generally from 1 to 60% by weight of the dispersion, preferably from 10 to 40% by weight.

The core particles of polyalkyl acrylate or of copolymer of alkyl acrylate/$\alpha,\beta$-unsaturated amide comonomer preferably have a hydrodynamic size of from 100 to 700 nm, preferably from 200 to 400 nm, the hydrodynamic size of the particles being measured by dynamic or thin-layer light scattering.

Owing to the small size of the core and therefore of the resulting particles, it is advantageously possible to promote the formation of conductive pathways in the subsequent composite material. It further permits the preparation of very thin composite films and allows easier application of the dispersions, for example by spraying.

Process for the Preparation of Dispersions of Particles

According to another aspect, the invention relates to a process for the preparation of a dispersion of particles comprising:
- a core constituted by an elastomeric polymer or by a copolymer of an elastomeric monomer and an $\alpha,\beta$-unsaturated amide comonomer,
- a coating constituted by polyaniline, and
- a non-ionic surfactant,
- said process comprising:
  a) the polymerization of elastomeric monomers, and where appropriate of $\alpha,\beta$-unsaturated amide monomers, in the presence of a non-ionic surfactant and of a polymerization catalyst in a dispersing medium; and
  b) the addition of aniline monomers and of a polymerization catalyst to the medium containing the particles of elastomeric polymer or of copolymer of elastomeric monomer and an $\alpha,\beta$-unsaturated amide comonomer obtained in step a).

Accordingly, in a particularly advantageous manner, the polymerization of the aniline monomers is carried out directly in the medium obtained after polymerization of the elastomer monomers, without it being necessary to isolate the elastomer particles formed as intermediates.

The synthesis of the dispersions of elastomer particles and of polyaniline can therefore advantageously be carried out in a single reactor in a continuous system.

Step a)

Within the scope of the present description, "elastomeric polymer" is understood as being a homopolymer or copolymer whose glass transition point(s) is/are below ambient temperature, preferably below 0° C., more preferably below −10° C., and better still below −20° C. The elastomers have properties analogous to those of natural rubber.

The elastomeric polymer is preferably a homopolymer.

Examples of elastomers used according to the invention are especially the elastomers of diolefins, such as polybutadiene, butadiene-styrene copolymers, butadiene-acrylonitrile copolymers, polychloroprene, elastomers of monoolefins, such as isobutylene, isobutylene-isoprene copolymers, polymers and copolymers of ethylene, such as chlorinated polyethylene, chlorosulfonated polyethylene, ethylene-vinyl acetate, ethylene-propylene, ethylene-acrylic ester copolymers, fluorinated elastomers, such as the chlorofluorinated elastomers obtained by copolymerization of trifluorochloroethylene with a diolefin such as butadiene or isoprene, and polycondensation elastomers, such as polyesters, polyurethanes, organic polysulfides and silicones, polyacrylic or methacrylic esters.

According to a particularly preferred variant, the elastomeric polymer is a polyacrylic or methacrylic ester, preferably a poly-$C_1$-$C_6$-alkyl acrylate or methacrylate, especially a poly-$C_1$-$C_6$-alkyl acrylate, more preferably poly-n-butyl acrylate.

The elastomeric monomers employed in step a) can be identical, in the case of an elastomeric homopolymer, or different, in the case of an elastomeric copolymer. It is preferred to use not more than two types of elastomeric monomers of different kinds. The elastomeric monomers are preferably of the same kind; more preferably, they are selected from the $C_1$-$C_6$-alkyl acrylates or methacrylates.

According to another preferred variant, the elastomeric polymer is a copolymer of elastomeric monomer and $\alpha,\beta$-unsaturated amide comonomer.

The $\alpha,\beta$-unsaturated amide comonomer can then be added as additive during the polymerization of the elastomeric monomer(s), preferably at the same time as the elastomeric monomer.

The surfactant is preferably non-ionic, acting as a stabilizer for the dispersion of elastomeric monomers and then of particles of elastomeric polymers.

According to a preferred variant, the dispersing medium comprises a second, preferably non-ionic surfactant.

The dispersing medium can be an organic solvent or water. It is preferably an aqueous medium, especially water.

The polymerization catalyst employed in step a) is used to initiate the polymerization reaction of the elastomeric polymer.

The polymerization catalyst can be selected from the compounds conventionally used for the polymerization of elastomeric polymers. It can be especially a free-radical polymerization catalyst or a metal catalyst. A free-radical polymerization catalyst is preferably used. Examples which may be mentioned include azo compounds, such as 2,2'-azobis(isobutyronitrile) (AIBN), and peroxide compounds, such as hydrogen peroxide or tert-butyl hydroperoxide. Other examples of polymerization catalysts are the compounds $K_2Cr_2O_7$, $KIO_3$, $K_2S_2O_8$, $Na_2S_2O_8$, $NaBO_3$, $H_2O_2$ and $(NH_4)_2 S_2O_8$. The polymerization catalyst is preferably an alkali metal or alkaline earth metal persulfate, such as sodium, potassium or lithium persulfate or ammonium persulfate, the latter being particularly preferred.

The amount of polymerization catalyst is not critical and generally varies from 0.001 to 5% by weight, based on the elastomeric monomer.

It is generally added in the form of a solution, which has preferably been degassed beforehand, for example by bubbling through an inert gas such as nitrogen or argon.

The sequence in which the reagents are introduced in step a) is not critical. However, it is preferable to add to the dispersing medium, in succession: (1) the non-ionic surfactant; (2) the elastomeric monomer and (3) the polymerization catalyst.

The temperature at which the polymerization of the elastomeric polymer is carried out is not critical and is generally from 35° to 90° C., preferably from 60° to 80° C. The reaction time can vary from several hours to several days. By way of information, when working at 70° C., the polymerization of poly-n-butyl acrylate is carried out in a reaction time of less than 24 hours.

Step b)

The aniline monomers and the polymerization catalyst are preferably added when the polymerization of the elastomeric monomers is complete.

The end of the polymerization of the elastomer can be determined by sampling and analyzing the solid polymer and/or the residual elastomeric monomers in the medium.

By way of example, the progress of the polymerization reaction of the elastomer can be monitored by gravimetric analysis, for example, or NMR.

The polymerization catalyst for step b) is preferably added after the aniline, and more particularly after the temperature of the medium has been lowered to a value below 0° C.

The polymerization catalyst can be selected from the compounds conventionally used for the polymerization of polyaniline. It can especially be identical or different to that employed in step a) in the polymerization of the elastomeric polymer.

According to a preferred variant, the polymerization catalyst employed in step b) is identical to that employed in step a). This allows the number of reagents and of possible by-products of the reaction to be limited.

The polymerization catalyst is preferably ammonium persulfate ($(NH_4)_2S_2O_8$). It is advantageously added in succession in the step of polymerization of the elastomeric polymer in step a) and of the polyaniline in step b).

The polymerization catalyst added in step b) preferably represents from 100 to 300% by weight, based on the aniline.

The aniline monomers are preferably polymerized in the presence of a doping agent. The polyaniline doping agent can be selected from the compounds conventionally used. It can be especially hydrochloric acid, phosphoric acid and its derivatives, phosphonic acid and its derivatives, sulfuric acid and its derivatives, sulfonic acid and its derivatives. According to a preferred variant, the doping agent is hydrochloric acid, which offers several advantages: it is economical and does not have surfactant properties which might affect the kinetics of polymerization. Moreover, unlike plasticizing doping agents, which are rarely available commercially, it does not require an additional treatment step following the polymerization.

"Doping agent" is understood as meaning an agent capable of converting polyaniline in the form of polyemeraldine base into polyaniline in acid (or emeraldine salt) form, which has conductive properties. It is generally employed in amounts varying from 0.5 to 3 mol %, based on the aniline.

According to a particularly preferred variant, the aniline monomers are employed in the form of anilinium hydrochloride.

The temperature of the reaction medium is not critical for the polyaniline polymerization and can vary from −5° C. to 30° C. However, it is preferred to work at a low temperature initially, especially at 0° C., and then to allow the temperature to rise to ambient temperature.

Completion of the aniline polymerization reaction can be determined according to conventional techniques, for example by UV measurement of the concentration of residual aniline monomer in the reaction medium.

A dispersion in which the polyaniline is adsorbed onto the surface of the particles of elastomeric polymer is thus obtained. The dispersion may nevertheless contain free polyaniline particles, i.e. particles which have not been adsorbed onto the surface of the elastomeric polymer. This has not been observed in the process according to the invention, however.

According to a particularly preferred variant, dispersions of poly-n-butyl acrylate-polyaniline particles are prepared according to the process comprising:

a) the polymerization of the n-butyl acrylate monomers in the presence of nonylphenol ethoxylate and of ammonium persulfate in water, and b) the polymerization of the anilinium hydrochloride monomers in the presence of ammonium persulfate in the medium obtained in step a).

According to another advantageous aspect, the preparation process according to the invention does not comprise a step in which the polyaniline is treated after the polymerization. Such post-treatment is generally necessary in the methods of the prior art to remove the reagents or toxic or corrosive solvents present in the reaction medium.

Accordingly, the dispersion obtained according to that process can be used directly in the preparation of conductive composites by simple evaporation of the dispersing medium. The polyaniline coatings then come into contact during a percolation phase and form a continuum of intrinsically conductive polymer through the elastomer matrix.

According to another aspect, the invention relates to the use of the electrically conductive particles according to the invention, or of a dispersion of such particles, in the preparation or application of a conductive material, especially a conductive film.

The invention relates also to a process for the preparation of a conductive film, comprising:
 a process for the preparation of a dispersion of particles of elastomer and of polyaniline as defined above, and
 removal of the dispersing medium.

Removal of the dispersing medium can be carried out according to conventional techniques, especially by evaporation, for example by heating and/or under reduced pressure or alternatively after centrifugation of the dispersion of particles.

According to a variant, the process comprises a step of application of the dispersion of elastomer particles and of polyaniline to a surface.

The dispersion of elastomer particles and of polyaniline employed according to that process is preferably a dispersion of particles of poly-$C_1$-$C_6$-alkyl acrylate and of polyaniline according to the invention.

The invention relates also to a conductive film obtainable starting from a lo dispersion of particles of $C_1$-$C_6$-alkyl and of polyaniline according to the process defined above.

Advantageously, the resulting conductive films have a specific conductivity of from 0.01 to 0.20 S/cm, especially from 0.01 to 5.00 S/cm.

The composites can be used especially in surface treatment, especially for their anti-static, anti-corrosive and thermal properties. They can also be used for their adhesion properties and for electromagnetic sheathing, textile, electroluminescent diodes (also called OLED: organic light-emitting diode).

The dispersions of particles according to the invention, processes for their preparation and their properties will appear more clearly from a study of the following examples, which are given solely by way of illustration and must not be considered as limiting the scope of the invention.

EXAMPLES

Materials and Methods

Igepal® CO 897 or nonylphenol ethoxylate 40 (also known as NP 40, HLB=17.8) was supplied by Rhodia.

Ninol® or polyoxyethylene lauramide was supplied by Stepan.

N-butyl acrylate, anilinium hydrochloride, anilinium disulfate, ammonium persulfate, acrylamide, phosphoric acid (85% in water), methylsulfonic acid, ethylsulfonic acid (70% in water), ethylphosphonic acid were supplied by Aldrich®.

The crosslinking agent 1,6-hexanediol diacrylate (SR238®) was supplied by Cray Valley.

The composites were analyzed as follows:

The thermal stability was measured using a device from TA Instrument (Thermal Analyst 2000). Measurements were carried out under a controlled atmosphere. The total flow rate is 100 ml/min with a distribution of 40 ml/min for the precision balance (nitrogen) and 60 ml/min for the oven (oxygen). The rate of heating is 10° C./min from 40° C. to 900° C.

The infrared spectra were recorded on a Bruker IFS 66/S device on KBr pellets. The spectra were obtained after 50 scans and a resolution of 4 $cm^{-1}$.

The UV visible spectra were recorded on a Shimadzu UV 2101 device with a wavelength scale of from 190 to 900 nm. The rate of aniline polymerization was assessed by measuring the residual monomer in the supernatant after centrifugation.

The size of the latex particles was measured on an inelastic light scattering apparatus, the DL 135-45, developed by the Institute Français du Pétrole. This technique allows the size of particles in concentrated solutions to be measured. The results were confirmed by dynamic light scattering on very dilute solutions (solvent: water, wavelength 514.5 nm).

The molecular weights were determined by steric exclusion chromatography (SEC) in THF. The samples are first dissolved in THF and filtered over 0.2 μm PTFE filters. The calibration is based on linear polystyrene standards.

The conductivity of the composites was measured using a four-wire device.

Abbreviations:
PBuA=poly-n-butyl acrylate
PANI-CI=polyaniline doped with HCl
PANI-$SO_4$=polyaniline doped with $H_2SO_4$
PANI-$CH_3SO_3$=polyaniline doped with $CH_3SO_3H$
PANI-$C_2H_5SO_3$=polyaniline doped with $C_2H_5SO_3H$
PANI-$C_2H_5PO_3$=polyaniline doped with $C_2H_5PO_3H_2$
PANI-$H_2PO_4$=polyaniline doped with $H_3PO_4$
PAam=polyacrylamide
TGA=thermal analysis
S/cm=Siemens/cm
Mn=molar mass measured by SEC.

Example 1

PBuA/PANI-CI with Igepal® CO 897 50/50

In a three-necked flask equipped with mechanical stirring, a condenser and an addition funnel, 3.325 g of dry Igepal® CO 897 surfactant are dissolved in 200 ml of water, and then 86.318 g of butyl acrylate (purified by passage over basic alumina) are added in a single batch to form the emulsion. The reaction mixture is heated to 70° C., and then the oxidizing solution (0.293 g of ammonium persulfate $(NH_4)_2S_2O_8$ in 4.088 ml of water) is added. The reaction mixture is left at 70° C. for 24 hours, with stirring (180 rpm). The polymerization yield is assessed at 87% by gravimetric analysis, and the solids content is 27.37% (Mn (SEC, refractometric detection)=428,700, Ip=3.0). The radius of the particles is measured by thin-layer light scattering at 110 nm. Thermal analysis: start of decomposition at 290° C., total decomposition at 600° C. 6.654 g of latex are removed and placed in a 250 ml flask containing 134.9 g of water. 2.06 g of anilinium hydrochloride are added to the mixture, stirring is carried out for 30 minutes, and then the temperature of the reaction mixture is lowered to 0° C. with magnetic stirring. The emulsion is degassed by bubbling through nitrogen for one hour, and then the degassed oxidizing solution is added dropwise to the preceding solution (ammonium persulfate, 3.657 g in 10.60 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 99%. The composition of the composite is determined by TGA as PBuA/PANI-CI=47/53. The composite has a conductivity of 0.20±0.03 $S.cm^{-1}$.

Example 2

PBuA/PANI-CI with Igepal® CO 897 80/20

In a three-necked flask equipped with mechanical stirring, a condenser and an addition funnel, 3.325 g of dry Igepal® CO 897 surfactant are dissolved in 200 ml of water, and then 86.318 g of butyl acrylate (purified by passage over basic alumina) are added in a single batch to form the emulsion. The reaction mixture is heated to 70° C., and then the oxidizing solution (0.293 g of ammonium is persulfate $(NH_4)_2S_2O_8$ in 4.09 ml of water) is added. The reaction mixture is left at 70° C. for 24 hours, with stirring (180 rpm). The polymerization yield is assessed at 87% by gravimetric analysis. The radius of the particles is measured by thin-layer light scattering at 110 nm. Thermal analysis: start of decomposition at 290° C., total decomposition at 600° C.

29.98 g of latex are removed and placed in a 250 ml flask containing 105.7 g of water. 2.01 g of anilinium hydrochloride are added to the mixture, stirring is carried out for 30 minutes, and then the temperature of the reaction mixture is lowered to 0° C. with magnetic stirring. The emulsion is degassed by bubbling through nitrogen for one hour, and then the degassed oxidizing solution is added dropwise to the preceding solution (ammonium persulfate, 3.557 g in 5.84 g of water). The polymerization is left for 5 hours at 0° C., with magnetic stirring, and then the reaction mixture is left at ambient temperature for 19 hours. The yield is measured by the concentration of residual anilinium (UV analysis) and is assessed at 98.7%. The composition of the composite is determined by TGA as PBuA/PANI-CI=80.3/19.7. The composite has a conductivity of 0.02±0.03 $S.cm^{-1}$.

Example 3

PBuA/PANI-CI with Igepal® CO 897 95/05

In a three-necked flask equipped with mechanical stirring, a condenser and an addition funnel, 1.650 g of Igepal® CO 897 surfactant are dissolved in 69.0 ml of water, and then 33.5 ml of butyl acrylate are added in a single batch to form the emulsion. The reaction mixture is heated to 70° C., and then the oxidizing solution (0.102 g of ammonium persulfate $(NH_4)_2S_2O_8$ in 3.00 ml of water) is added. The reaction mixture is left at 70° C. for 24 hours, with stirring (200 rpm). A sample allows the solids content to be measured as 29%. The radius of the particles is measured by light scattering at 100 nm. Thermal analysis: start of decomposition at 290° C., total decomposition at 600° C.

The reaction mixture is stirred and brought gradually to ambient temperature, and then 1.50 g of anilinium hydrochloride are added. After stirring for 30 minutes, the reaction mixture is cooled to 0° C. for the dropwise addition of the oxidizing solution (ammonium persulfate, 2.672 g in 5.0 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 99%. The composition of the composite is determined by TGA as PBuA/PANI-Cl=95/05. The composite has a conductivity of 0.01 S.cm$^{-1}$.

Example 4

Crosslinked PBuA/PANI-Cl with Igepal® CO 897 95/05

In a three-necked flask equipped with mechanical stirring, a condenser and an addition funnel, 1.675 g of Igepal® CO 897 surfactant are dissolved in 69.6 ml of water, and then 33.5 ml of butyl acrylate and 1.06 g of SR238 are added in a single batch to form the emulsion. The reaction mixture is heated to 70° C., and then the oxidizing solution (0.102 g of ammonium persulfate $(NH_4)_2S_2O_8$ in 2.00 ml of water) is added. The reaction mixture is left at 70° C. for 24 hours, with stirring (180 rpm). A sample allows the polymerization yield to be measured at 97% by gravimetric analysis. The radius of the particles is measured by light scattering at 100 nm.

The reaction mixture is stirred and brought to ambient temperature, and then 1.512 g of anilinium hydrochloride are added. After stirring for 30 minutes, the reaction mixture is cooled to 0° C. for the dropwise addition of the oxidizing solution (ammonium persulfate, 2.675 g in 5.0 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 99%. The composition of the composite is determined by TGA as PBuA/PANI-Cl=95.0/05.0. The composite has a conductivity of $2\times10^{-4}$ S.cm$^{-1}$.

Example 5

Crosslinked PBuA/PANI-Cl with Igepal® CO 897 80/20

In a three-necked flask equipped with mechanical stirring, a condenser and an addition funnel, 4.771 g of dry Igepal® CO 897 surfactant are dissolved in 200.5 ml of water, and then 96 ml of butyl acrylate (purified by passage over basic alumina) and 3 ml of SR238 crosslinker are added in a single batch to form the emulsion. The reaction mixture is heated to 70° C., and then the oxidizing solution (0.300 g of ammonium persulfate $(NH_4)_2S_2O_8$ in 2.93 g of water) is added. The reaction mixture is left at 70° C. for 24 hours, with stirring (180 rpm). The polymerization yield to be assessed at 89.3% by gravimetric analysis, presence of aggregates, solids content at 27.97%. The radius of the particles is measured by thin-layer light scattering at 125 nm.

28.57 g of latex are removed and placed in a 250 ml flask containing 107.12 g of water. 2.045 g of anilinium hydrochloride are added to the mixture, stirring is carried out for 30 minutes, and then the temperature of the reaction mixture is lowered to 0° C. with magnetic stirring. The emulsion is degassed by bubbling through nitrogen for one hour, and then the degassed oxidizing solution is added dropwise to the preceding solution (ammonium persulfate, 3.555 g in 8.96 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 99%. The composition of the composite is determined by TGA as PBuA/PANI-Cl=80/20. The composite has a conductivity of 0.10±0.02 S.cm$^{-1}$.

Example 6

PBuA/PANI-Cl with Igepal® CO 897 and Ninol® 80/20

In a three-necked flask equipped with mechanical stirring, a condenser and an addition funnel, 3.320 g of Igepal® CO 897 surfactant and 1.298 g of Ninol® are dissolved in 201 g of water, and then 88.88 g of butyl acrylate are added in a single batch to form the emulsion. The reaction mixture is heated to 70° C., and then the oxidizing solution (0.372 g of ammonium persulfate $(NH_4)_2S_2O_8$ in 5 ml of water) is added. The reaction mixture is left at 70° C. for 24 hours, with stirring (180 rpm). The polymerization yield is assessed at 87% by gravimetric analysis, the particle size (radius) is measured by light scattering at 105 nm.

30 g of latex are removed and placed in a 250 ml flask containing 100.7 g of water. 2.03 g of anilinium hydrochloride are added to the mixture, stirring is carried out for 30 minutes, and then the temperature of the reaction mixture is lowered to 0° C. with magnetic stirring. The emulsion is degassed by bubbling through nitrogen for one hour, and then the degassed oxidizing solution is added dropwise to the preceding solution (ammonium persulfate, 3.65 g in 8 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 98.5%. The composition of the composite is determined by TGA as PBuA/PANI-Cl=80.3/19.6. The composite has a conductivity of 1.00 S.cm$^{-1}$.

Example 7

PBuA/PANI-Cl with Igepal® CO 897 and Ninol® 97.55/2.45 with Latex having a High Solids Content In a three-necked flask equipped with mechanical stirring, a condenser and an addition funnel, 4.259 g of Igepal® CO 897 surfactant and 1.563 g of Ninol® are dissolved in 155.00 g of water, and then 114.66 g of butyl acrylate are added in a single batch to form the emulsion. The reaction mixture is heated to 60° C., and then the oxidizing solution (0.280 g of ammonium persulfate $(NH_4)_2S_2O_8$ in 5 ml of water) is added. The reaction mixture is left at 60° C. for 24 hours, with stirring (250 rpm). The polymerization yield is assessed at 99.9% by gravimetric analysis, the particle size (radius) is measured by light scattering at 160 nm.

40.16 g of latex are removed and placed in a 100 ml flask containing 10.05 g of water. 0.58 g of anilinium hydrochloride are added to the mixture, stirring is carried out for 30 minutes, and then the temperature of the reaction mixture is lowered to 0° C. with stirring. The emulsion is degassed by bubbling through nitrogen for one hour, and then the degassed oxidizing solution is added dropwise to the preceding solution (ammonium persulfate, 1.028 g in 1.514 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 97.5%. The composite has a conductivity of below $10^{-5}$ S.cm$^{-1}$.

Example 8

PBuA/PANI-Cl with Igepal® CO 897 and Ninol® 97.55/2.45

In a three-necked flask equipped with mechanical stirring, a condenser and an addition funnel, 3.181 g of Igepal® CO 897 surfactant and 1.160 g of Ninol® are dissolved in 201.325 g of water, and then 86.00 g of butyl acrylate are added in a single batch to form the emulsion. The reaction mixture is heated to 70° C., and then the oxidizing solution (0.300 g of ammonium persulfate $(NH_4)_2S_2O_8$ in 5 ml of water) is added. The reaction mixture is left at 70° C. for 24 hours, with stirring (250 rpm). The polymerization yield is assessed at 99.9% by gravimetric analysis, the particle size (radius) is measured by light scattering at 150 nm. 30.05 g of latex are removed and placed in a 100 ml flask containing 20.02 g of water. 0.316 g of anilinium hydrochloride are added to the mixture, stirring is carried out for 30 minutes, and then the temperature of the reaction mixture is lowered to 0° C., with stirring. The emulsion is degassed by bubbling through nitrogen for one hour, and then the degassed oxidizing solution is added dropwise to the preceding solution (ammonium persulfate, 0.544 g in 2.02 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 97.5%. The composite has a conductivity of below $10^{-5}$ S.cm$^{-1}$.

Example 9

PBuA/PANI-SO$_4$ with Igepal® CO 897 and Ninol® 84.2/15.8

In a three-necked flask equipped with mechanical stirring, a condenser and an addition funnel, 3.181 g of Igepal® CO 897 surfactant and 1.160 g of Ninol® are dissolved in 201.325 g of water, and then 86.00 g of butyl acrylate are added in a single batch to form the emulsion. The reaction mixture is heated to 70° C., and then the oxidizing solution (0.300 g of ammonium persulfate $(NH_4)_2S_2O_8$ in 5 ml of water) is added. The reaction mixture is left at 70° C. for 24 hours, with stirring (250 rpm). The polymerization yield is assessed at 99.9% by gravimetric analysis, the particle size (radius) is measured by light scattering at 150 nm.

30.05 g of latex are removed and placed in a 250 ml flask containing 80.07 g of water. 2.430 g of anilinium disulfate are added to the mixture, stirring is carried out for 30 minutes, and then the temperature of the reaction mixture is lowered to 0° C., with stirring. The emulsion is degassed by bubbling through nitrogen for one hour, and then the degassed oxidizing solution is added dropwise to the preceding solution (ammonium persulfate, 3.864 g in 5.02 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 99.7%. The composite has a conductivity of 0.24 S.cm$^{-1}$.

Example 10

PBuA/PANI-CH$_3$SO$_3$ with Igepal® CO 897 and Ninol® 84.2/15.8

In a three-necked flask equipped with mechanical stirring, a condenser and an addition funnel, 3.181 g of Igepal® CO 897 surfactant and 1.160 g of Ninol® are dissolved in 201.325 g of water, and then 86.00 g of butyl acrylate are added in a single batch to form the emulsion. The reaction mixture is heated to 70° C., and then the oxidizing solution (0.300 g of ammonium persulfate $(NH_4)_2S_2O_8$ in 5 ml of water) is added. The reaction mixture is left at 70° C. for 24 hours, with stirring (250 rpm). The polymerization yield is assessed at 99.9% by gravimetric analysis, the particle size (radius) is measured by light scattering at 150 nm.

30.04 g of latex are removed and placed in a 250 ml flask containing 80.10 g of water. 3.163 g of methyl anilinium sulfonate are added to the mixture, stirring is carried out for 30 minutes, and then the temperature of the reaction mixture is lowered to 0° C., with stirring. The emulsion is degassed by bubbling through nitrogen for one hour, and then the degassed oxidizing solution is added dropwise to the preceding solution (ammonium persulfate, 3.858 g in 5.02 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 99.7%. The composite has a conductivity of 0.14 S.cm$^{-1}$.

Example 11

PBuA/PANI-CH$_3$CH$_2$SO$_3$ with Igepal® CO 897 and Ninol® 84.2/15.8

In a three-necked flask equipped with mechanical stirring, a condenser and an addition funnel, 3.181 g of Igepal® CO 897 surfactant and 1.160 g of Ninol® are dissolved in 201.325 g of water, and then 86.00 g of butyl acrylate are added in a single batch to form the emulsion. The reaction mixture is heated to 70° C., and then the oxidizing solution (0.300 g of ammonium persulfate $(NH_4)_2S_2O_8$ in 5 ml of water) is added. The reaction mixture is left at 70° C. for 24 hours, with stirring (250 rpm). The polymerization yield is assessed at 99.9% by gravimetric analysis, the particle size (radius) is measured by light scattering at 150 nm.

30.04 g of latex are removed and placed in a 250 ml flask containing 80.10 g of water. 3.400 g of ethyl anilinium sulfonate are added to the mixture, stirring is carried out for 30 minutes, and then the temperature of the reaction mixture is lowered to 0° C., with stirring. The emulsion is degassed by bubbling through nitrogen for one hour, and then the degassed oxidizing solution is added dropwise to the preceding solution (ammonium persulfate, 3.879 g in 5.021 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 99.6%. The composite has a conductivity of 0.14 S.cm$^{-1}$.

Example 12

PBuA/PANI-CH$_3$CH$_2$PO$_3$ with Igepal® CO 897 and Ninol® 84/16

In a three-necked flask equipped with mechanical stirring, a condenser and an addition funnel, 3.181 g of Igepal® CO 897 surfactant and 1.160 g of Ninol® are dissolved in 201.325 g of water, and then 86.00 g of butyl acrylate are added in a single batch to form the emulsion. The reaction mixture is heated to 70° C., and then the oxidizing solution (0.300 g of ammonium persulfate $(NH_4)_2S_2O_8$ in 5 ml of water) is added. The reaction mixture is left at 70° C. for 24 hours, with stirring (250 rpm). The polymerization yield is assessed at 99.9% by gravimetric analysis, the particle size (radius) is measured by light scattering at 150 nm.

40.05 g of latex are removed and placed in a 250 ml flask containing 106.89 g of water. 5.0 g of anilinium ethylphosphonate are added to the mixture, stirring is carried out for 30 minutes, and then the temperature of the reaction mixture is lowered to 0° C., with stirring. The emulsion is degassed by bubbling through nitrogen for one hour, and then the degassed oxidizing solution is added dropwise to the preceding solution (ammonium persulfate, 5.175 g in 6.648 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 99.7%. The composite has a conductivity of 0.11 $S.cm^{-1}$.

Example 13

PBuA/PANI-HPO$_4$ with Igepal® CO 897 and Ninol® 85/15

In a three-necked flask equipped with mechanical stirring, a condenser and an addition funnel, 3.181 g of Igepal® CO 897 surfactant and 1.160 g of Ninol® are dissolved in 201.325 g of water, and then 86.00 g of butyl acrylate are added in a single batch to form the emulsion. The reaction mixture is heated to 70° C., and then the oxidizing solution (0.300 g of ammonium persulfate $(NH_4)_2S_2O_8$ in 5 ml of water) is added. The reaction mixture is left at 70° C. for 24 hours, with stirring (250 rpm). The polymerization yield is assessed at 99.9% by gravimetric analysis, the particle size (radius) is measured by light scattering at 150 nm.

30.08 g of latex are removed and placed in a 250 ml flask containing 80.1 g of water. 3.190 g of anilinium phosphate are added to the mixture, stirring is carried out for 30 minutes, and then the temperature of the reaction mixture is lowered to 0° C., with stirring. The emulsion is degassed by bubbling through nitrogen for one hour, and then the degassed oxidizing solution is added dropwise to the preceding solution (ammonium persulfate, 3.860 g in 5.033 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 99.4%. The composite has a conductivity of 0.15 $S.cm^{-1}$.

Example 14

PBuA-co-PAam/PANI-Cl with Igepal® CO 897 and Ninol® 85/15

In a three-necked flask equipped with mechanical stirring, a condenser and an addition funnel, 3.181 g of Igepal® CO 897 surfactant, 1.160 g of Ninol® and 2.5 g of acrylamide are dissolved in 199.86 g of water, and then 83.38 g of butyl acrylate are added in a single batch to form the emulsion. The reaction mixture is heated to 70° C., and then the oxidizing solution (0.300 g of ammonium persulfate $(NH_4)_2S_2O_8$ in 5 ml of water) is added. The reaction mixture is left at 70° C. for 24 hours, with stirring (250 rpm). The polymerization yield is assessed at 99.9% by gravimetric analysis, the particle size (radius) is measured by light scattering at 160 nm.

30.07 g of latex are removed and placed in a 250 ml flask containing 80.4 g of water. 2.173 g of anilinium hydrochloride are added to the mixture, stirring is carried out for 30 minutes, and then the temperature of the reaction mixture is lowered to 0° C., with stirring. The emulsion is degassed by bubbling through nitrogen for one hour, and then the degassed oxidizing solution is added dropwise to the preceding solution (ammonium persulfate, 3.878 g in 5.030 ml of water). The polymerization is left for 5 hours at 0° C., with magnetic stirring, and then the reaction mixture is left at ambient temperature for 19 hours. The yield is measured by the concentration of residual anilinium (UV analysis) and is assessed at 99.4%. The composite has a conductivity of 0.18 $S.cm^{-1}$.

The invention claimed is:
1. Electrically conductive nanocomposite particles comprising:
   a core constituted by an elastomeric polymer selected from the group consisting of a poly-$C_1$-$C_6$-alkyl acrylate homopolymer, poly-$C_1$-$C_6$-alkyl methacrylate homopolymer or by a copolymer of $C_1$-$C_6$-alkyl acrylate and an α,β-unsaturated amide comonomer;
   a coating constituted by polyaniline; and
   a non-ionic surfactant physically absorbed to the surface of said core.
2. Particles according to claim 1, in which the poly-$C_1$-$C_6$-alkyl acrylate is poly-n-butyl acrylate.
3. Particles according to claim 1, in which the polyalkyl acrylate is crosslinked.
4. Particles according to claim 1, in which said α,β-unsaturated amide comonomer is acrylamide.
5. Particles according to claim 1, in which the ratio by weight of polyalkyl acrylate/polyaniline varies from 45:55 to 98:2.
6. Particles according to claim 5, in which the non-ionic surfactant is a compound of formula (I):

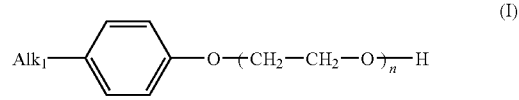

(I)

wherein Alk$_1$ represents a $C_1$-$C_{15}$-alkyl group and n represents an integer from 1 to 100.
7. Particles according to claim 1, in which the surfactant represents from 1 to 20% by weight, based on the total dry weight of the coating and the core.
8. Particles according to claim 1, further comprising a second non-ionic surfactant.
9. Particles according to claim 8, in which the second non-ionic surfactant includes at least one amide function.
10. Particles according to claim 9, in which the second non-ionic surfactant is a compound of formula (II):

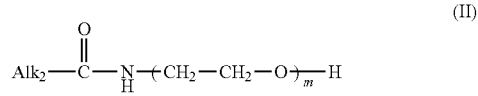

(II)

wherein Alk$_2$ represents a $C_1$-$C_{20}$-alkyl group and m represents an integer from 1 to 100.

11. Particles according to claim 9, in which the second non-ionic surfactant represents from 1 to 20% by weight, based on the total dry weight of the coating and the core.

12. Dispersion of electrically conductive nanocomposite particles comprising particles as defined in claim 1 in a dispersing medium.

13. Dispersion according to claim 12, in which the dispersing medium is an aqueous medium.

14. Dispersion according to claim 12, in which the core has a hydrodynamic size of from 100 to 700 nm, preferably from 200 to 400 nm.

15. Process for the preparation of a dispersion of particles according to claim 1 comprising:
- a core constituted by an elastomeric polymer or by a copolymer of an elastomeric monomer and an $\alpha,\beta$-unsaturated amide comonomer,
- a coating constituted by polyaniline, and
- a non-ionic surfactant, said process comprising:
a) the polymerization of elastomeric monomers, and where appropriate of $\alpha,\beta$-unsaturated amide monomers, in the presence of a non-ionic surfactant and of a polymerization catalyst in a dispersing medium; and
b) the addition of aniline monomers and of a polymerization catalyst to the medium containing the particles of elastomeric polymer or of copolymer of elastomeric monomer and an $\alpha,\beta$-unsaturated amide comonomer obtained in step a).

16. Process according to claim 15, in which the aniline monomers are anilinium hydrochloride monomers.

17. Process according to claim 15, in which the elastomeric polymer is selected from the poly-$C_1$-$C_6$-alkyl acrylates or poly-$C_1$-$C_6$-alkyl methacrylates.

18. Process according to claim 17, in which the polymer is a poly-$C_1$-$C_6$-alkyl acrylate.

19. Process according to claim 18, in which the poly-$C_1$-$C_6$-alkyl acrylate is poly-n-butyl acrylate.

20. Process according to claim 15, in which the dispersing medium is an aqueous medium.

21. Process according to claim 15, in which the $\alpha,\beta$-unsaturated amide comonomer is acrylamide.

22. Process according to claim 15, in which the dispersing medium in step a) further comprises a second surfactant.

23. Process according to claim 15, in which the polymerization catalyst added in step b) is identical to that employed in step a).

24. Process for the preparation of a conductive film, comprising:
- a process for the preparation of a dispersion of particles according to claim 15; and
- removal of the dispersing medium.

25. Process according to claim 24, in which the dispersion of particles is a dispersion homopolymer or by a copolymer of $C_1$-$C_6$-alkyl acrylate and an $\alpha,\beta$-unsaturated amide comonomer, b) a coating constituted by polyaniline, and c) a non-ionic surfactant.

26. Conductive film obtainable according to the process of claim 25.

* * * * *

UNITED STATES PATENT AND TRADEMARK OFFICE
CERTIFICATE OF CORRECTION

PATENT NO. : 7,968,009 B2  
APPLICATION NO. : 11/996814  
DATED : June 28, 2011  
INVENTOR(S) : Reynaud et al.

Page 1 of 1

It is certified that error appears in the above-identified patent and that said Letters Patent is hereby corrected as shown below:

In the Claims

Column 16, line 27, Claim 1 please change:

"absorbed" to -- adsorbed --

Signed and Sealed this
Twelfth Day of November, 2013

Teresa Stanek Rea
*Deputy Director of the United States Patent and Trademark Office*